United States Patent
Koeber

[15] 3,639,997
[45] Feb. 8, 1972

[54] PENDULOUS RANGE FINDING DEVICE
[72] Inventor: Henry J. Koeber, Deerfield, Ill.
[73] Assignee: Bell & Howell Company, Chicago, Ill.
[22] Filed: Nov. 16, 1970
[21] Appl. No.: 90,142

Related U.S. Application Data
[63] Continuation of Ser. No. 735,293, June 7, 1968.

[52] U.S. Cl..................................33/221, 33/70, 33/71, 33/215
[51] Int. Cl.....................G01c 1/00, G01c 3/00, G01c 9/12
[58] Field of Search.............................308/36, 37, 240

Primary Examiner—Robert B. Hull
Attorney—Hume, Clement, Hume & Lee

[57] ABSTRACT

A range finding device using the principle of triangulation and having a pendulous member selectively adjustable in low-frictional engagement about a support axle and lockable in an adjusted position with an indicator relative an expanded scale.

10 Claims, 5 Drawing Figures

PATENTED FEB 8 1972
3,639,997
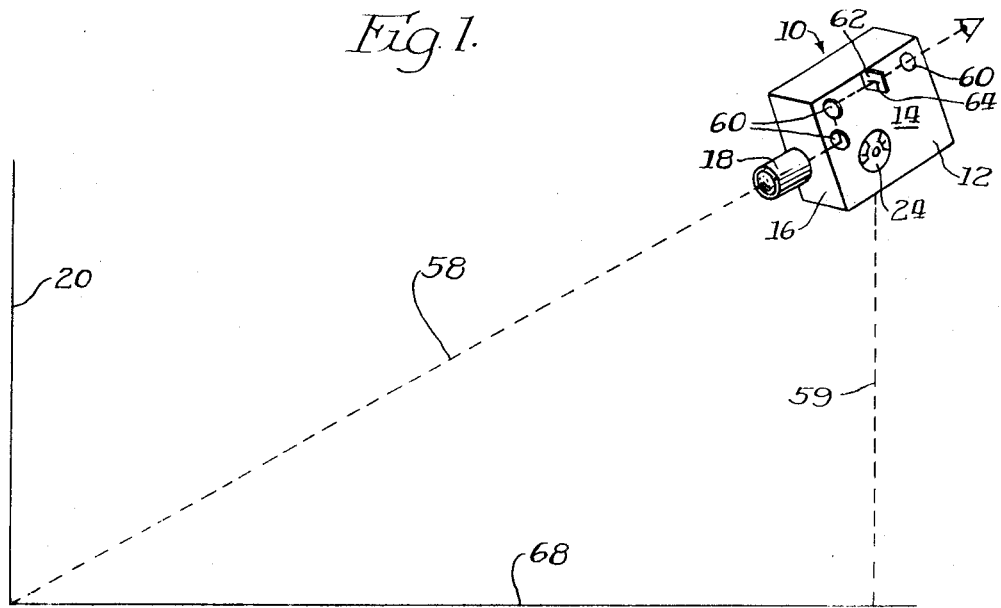
Fig. 1.
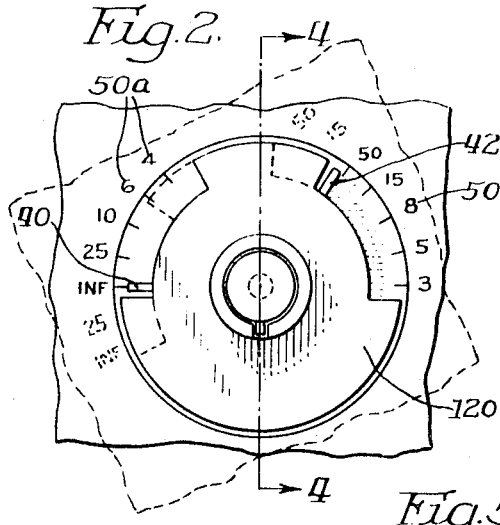
Fig. 2.
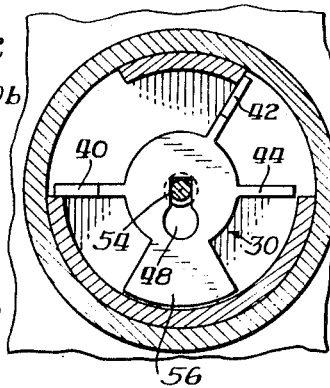
Fig. 3.
Fig. 4.
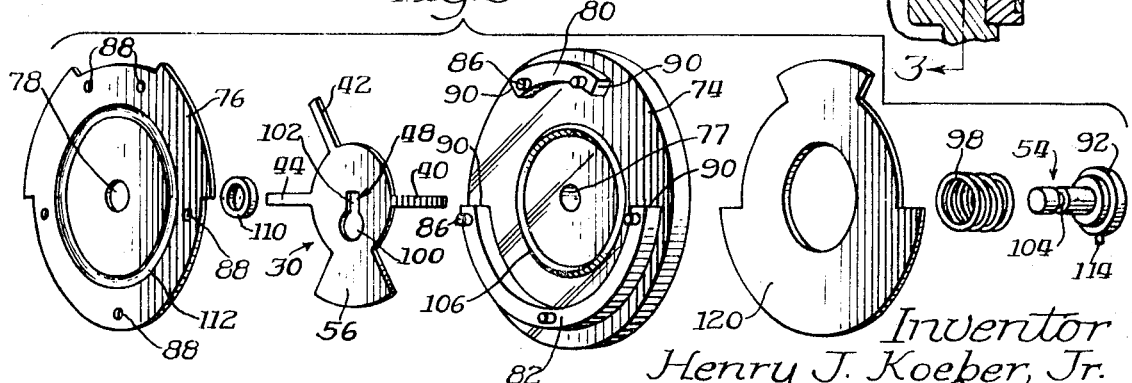
Fig. 5.
Inventor
Henry J. Koeber, Jr.
By William J. Ruecle
John E. Meele
Attys

PENDULOUS RANGE FINDING DEVICE

This application is a continuation of my copending application Ser. No. 735,293, filed June 7, 1968.

The present invention relates to a range determining device using the principle of triangulation. Particularly, the invention relates to a range determining device usable to ascertain the distance from a viewing point to a subject, the device having a pendulous member in low frictional engagement on a support and having an indicator lockable, until released in an adjusted orientation relative to an expanded scale.

Range determining devices using the principle of triangulation for determining the distance between a camera and a subject are known. One such pendulous range determining device is described in a copending application, titled CAMERA FOCUSING MECHANISM USING TRIANGULATION PRINCIPLE, filed June 7, 1968, and assigned to the assignee of the present application, and which issued Dec. 29, 1970 as U.S. Pat. No. 3,550,516. That copending application discloses an improved pendulous rangefinder mechanism which can be used in a camera for fixing the position of an adjustable objective wherein that objective is focused on a remotely located subject. According to that application, a pendulous rangefinder member swings relative to the optical axis of an objective to an aspect corresponding to focal distance as determined by the inclination of the axis, when the camera is aimed at the base of a subject. The objective is then moved by direct manually applied torque to a predetermined distance from the pendulous member to cause the objective to be focused on the subject. This rangefinder assembly must be built into the camera, and thus, could not be used as an accessory or be added to an already designed camera.

In accordance with the present invention, a rangefinding device using the principle of triangulation is provided. The device is adapted to be used either as a built-in addition to an existing optical instrument or camera or it may be used as an independent accessory to such an instrument. In either case, the device includes a pendulous member which is movable into an oriented position under the influence of gravity. In order for the device to have high-adjustment sensitivity, the pendulous member is supported with low-frictional engagement. After orientation, the pendulous member is locked in the adjusted orientation so that the position of a pair of indicator portions relative a pair of distance indicating scales may be read. By the arrangement of the scales, an accurate reading of the distance indication is possible. The distance indicated may then be transferred to the focusable objective of the instrument to focus that objective on the subject at that distance.

It is an object of the invention to provide a range finding device having the foregoing characteristics which will be efficient in use, durable, and which can be manufactured for a reasonable cost.

Further and other objects will be apparent from the description of the accompanying drawings in which like numerals refer to like parts.

In the drawings:

FIG. 1 is a schematic representation of an optical instrument incorporating the rangefinding device of this invention, the instrument being in range finding orientation with respect to the base of a remote subject;

FIG. 2 is an enlarged elevational view of the distance indicating scale of the device;

FIG. 3 is a sectional view of the range finding device taken along line 3—3 of FIG. 4;

FIG. 4 is a sectional view of the rangefinding device taken along line 4—4 of FIG. 2; and FIG. 5 is an exploded perspective view of the components of the rangefinding device.

Referring now to FIG. 1, there is shown an optical instrument, such as a camera 10 with a housing 12 having wall portions including a sidewall 14, and a front wall 16 supporting a focusable objective 18. This objective focuses the image of a distant subject, schematically shown as a line 20, on an image plane within the housing. As the distance to the subject changes, the spacing of the objective relative to the film plane must be changed to maintain the focal plane of the objective in coincidence therewith. To correlate the relative adjustment of the objective for focusing at different distances, a distance scale (not shown) is inscribed on the lens barrel for alignment in a conventional manner relative to a reference mark (not shown). When a particular distance reference is so aligned, the objective is focused for that distance.

To determine the distance from the camera to the subject, range determining device 24 may be mounted on sidewall 14 of instrument 10. This device includes a pendulous member 30 mounted for free swinging movement into a gravity oriented position and means for selectively locking the pendulous member in the adjusted orientation. As seen in FIG. 5, the pendulous member includes a pair of indicator arms 40, 42 and counterbalance arm 44. These arms extend radially from the center of the pendulous member, in which center is cutout or support receiver 48 formed in the shape of an inverted keyhole. When the pendulous member moves, the indicator arms move in relation to split distance scales 50a and 50b, which scales are inscribed on the camera housing as shown in FIG. 2.

Indicator arms 40 and 42 are arranged for positioning with respect to distance scales 50a and 50b, respectively, so that both arms indicate the same distance. For greater accuracy and ease of reading, the indicia on the respective scales are generally alternating. For example, when indicator arm 40 points between numbers 4 and 6 on scale 50a, indicator arm 42 points toward number 5 on scale 50b. When the camera is pointed downwardly and member 30 is locked to determine the distance to the subject, the operator reads the distance from the scale more definitively indicating that distance. The user then adjusts the objective to the distance setting indicated by the scale and the objective is focused on the subject at that distance.

By location of the distance indications on different scales, more space is available to inscribe the desired numbers. Thus, although the device is of small dimensions, an expanded scale is provided enabling larger size indicia to be used than would be possible if only one portion of the scale were available. In this preferred embodiment, illustrated in FIG. 2, the scale indications are in footage dimensions. Sufficient area is available to inscribe several numerals in sequence to enable accurate readings to be made of the distance determined by the position of the pendulous member.

Pendulous member 30 is supported for free swinging movement on a pivot or support member shown as an axle 54. When in the free swinging condition, lower mass portion 56 of the pendulous member seeks a gravity oriented, vertical position. The pendulous member is arranged for orientation about an axis perpendicular to optical axis 58 as defined by objective 18 of the camera.

Relying on the principle of triangulation, the operator may view the subject through a viewfinder system in the camera, which system is shown as elements 60, 62. The base of subject 20 is aligned with a reference line 64 in the viewfinder system, thereby generating an angle of inclination of optical axis 58 along a line which might be defined as the hypotenuse of a right triangle. Vertical leg 59 of the right triangle will be understood to extend downwardly from range determining device 24 to a point at which this line intersects a horizontal or base line 68 which extends to the base of the subject.

Vertical line 59 is computed as a "constant" since most users will be assumed to be adults of average height. By mathematical computations, it can be seen that the distance along horizontal line 68 of the right triangle can be determined. By these computations, the distance indicating scale 50 and the indicator arms 40, 42 of the pendulous member may be arranged so that upon selected angles of inclination between the optical axis and the substantially horizontal line, the angle is translated into a distance indication. Thus, the angular orientation of the pendulous member corresponds to a given distance, which distance is readable from the scales 50a, 50b. As suggested in FIG. 2, pendulous member 30, when free to move, attains an orientation fixed relatively in space. Upon rotation of the instrument housing from the solid line position to the dotted line position, the scale is rotated with respect to the "fixed" indicator arms wherein for that orientation, one arm would be aligned with "10."

As seen in FIGS. 4 and 5, range determining device 24 is constructed with a partially closed casing defined by an outer plate 74 and an inner or backplate 76. In this preferred embodiment, plate 74 is molded of transparent plastic material so that indicator arms 40, 42 are visible therethrough. Plate 120 is fixed to the exterior of device 24 as an opaque cover to substantially hide those parts which would otherwise be visible through plate 74. Axle bearing cutouts 77 and 78 are provided in plates 74 and 76 respectively.

From the inner face of outer plate 74 extend positioners 80, 82 which in this embodiment are fitted into wall portion 14 of instrument housing 12. Inner plate portion 76 is fixed to the outer plate by fasteners, disclosed as heat deformable studs 86, which pass through holes 88 in the backing plate where they might be deformed during assembly.

Positioners 80, 82 are shown of arcuate shape and are formed such that their arcuate extents provide a predetermined angle between adjacent ends 90. These ends or stops are located in the path of movement of indicator arms 40, 42, and act as limiters to limit the angle of swinging movement of the pendulous member by engagement of the outer end portion of the indicator arms. Although the pendulous member with its counterweight arm 44 is disclosed as being freely movable interiorly of arcuate positioners 80, 82, it is to be understood that the extent of movement of the pendulous member may be controlled and the indicator arms may be moved without physical restraint except as controlled by the limited arc through which the mass 56 of indicator member 30 may move.

Axle or pivot 54 supports pendulous member 30 for movement between the free swinging condition and the locked condition. Member 30 is provided with an inverted keyhole-shaped aperture 48 having an enlarged portion 100 through which the axle can pass during assembly and a smaller squared bearing portion 102 which rests on a reduced axle portion 104 during operation. For assembly, the axle is passed through the enlarged portion to align the reduced portion thereof with the pendulous member. The member is then positioned over reduced portion 104 such that the upper flat surface of the squared receiving portion engages the reduced portion of the axle. The sides of the squared portion may also engage the axle to provide for three point control therewith. This reduced portion of the axle extends a short length to permit limited axial movement of pendulous member 30 before engagement by either longitudinally spaced shoulder at the ends of the reduced axle portion.

Positioning of the pivot axle 54 under the influence of resilient member 98 causes pendulous member 30 to be locked in the orientation to which it last moved when free. Locking occurs when the pendulous member is urged into frictional engagement with a ring 106, cross sectioned as a cone, which ring extends inwardly of the interior surface of the cover plate 74. When button 92 is pushed inwardly to compress the resilient means, the axle 54 moves so that the exterior shoulder pushes pendulous member 30 free of ring 106. The amount of axial movement of the member is limited by a spacer ring 110, which surrounds the interior end of axle 54 and thereby maintains pendulous member 30 clear of the semicircular aligning rib 112, which rib is formed interior of the backing plate 76. This rib prevents undue jolting of the pendulous member when the latter is in free swinging condition. In this condition, the member is free to move about axle 54 until button 92 is released.

Movement of pendulous member 30 about axle 54 is made relatively sensitive by the straight edge contact with possible three point control between the round axle and the squared bearing portion 102. Significantly lower friction is generated between the pendulous member and the axle by the essentially point or line contact with the axle than would occur if the bearing portion were rounded and generated substantially arcuate contact. Yet the three point control precludes undesired movements of the pendulous member at all inclinations thereof as might be anticipated by normal use of the instrument. The three points of control prevent undesirable shifting of the pendulous member in all directions except upwardly thereby retaining the pendulous member in condition for operation. Although the keyhole 48 is provided in this preferred embodiment, a closed square opening or a triangular opening sized to accept the axle might be used with similarly advantageous results, insofar as point contact is concerned.

A connection by a pin 114, extending from button 92, and a slot 116 formed in sleeve 94 prevents unintentional rotation of pendulous member 30. Such rotation might otherwise occur by the tendency of an operator when pushing the button to inadvertently rotate same. Should this rotation occur, the position, which the pendulous member would assume under the influence of gravity, might be altered so as to provide an erroneous reading.

It is to be understood that the embodiments shown are illustrative of the principle of operation of a range determining device by which distance is ascertained relying on the principle of triangulation and that certain changes, alterations, modifications or substitutions can be made in the structure of the device without departing from the spirit and scope of the claims.

The embodiments of the invention in which an exclusive property or privilege is claimed are defined as follows:

1. A range determining device using the principle of triangulation, comprising:

a housing adapted for orientation about a predetermined axis;

a pendulous member supported in said housing for selective conditioning for movement under the influence of gravity to an adjusted orientation and for being restrained in said adjusted orientation;

support means of round cross section being positionable in said housing and having manually operable release means integral therewith for displacing said support means axially relative to said housing;

a support receiver arranged in said pendulous member and including a cutout of sufficient area away from the bearing contact region to accept releasably said support means and having in said bearing contact region at least one straight edge extending transversely of the round cross section of said support means and engageable in substantially axial line contact therewith for supporting of said pendulous member for low-friction movement about said support means and for movement between a first position and a second position;

means biasing said support means to move said pendulous member to one of said positions and being yieldable for positive displacement of said release means to move said pendulous member to the other of said positions; and restraining means within said housing positioned for engagement by said pendulous member in one of said positions to restrain said member against movement about said axis, said pendulous member being arranged for free movement about said axis under the influence of gravity when in the other said position.

2. A device as in claim 1 wherein said manually operable release means includes means for operative connection with said housing to prevent rotation of said release means upon manual operation thereof.

3. A device as in claim 1 wherein said pendulous member includes a pair of angularly related indicator portions, and said housing includes a pair of scale portions relative to which said indicator portions are movable wherein said scale portions enable more accurate interpretation of the adjusted orientation of said pendulous member.

4. A range determining device using the principle of triangulation, comprising:

a housing adapted for orientation about a predetermined axis;

a pendulous member disposed in said housing for pendulous movement under the influence of gravity;

a support receiver arranged in said pendulous member including a cutout having a straight bearing edge;

support means axially extending in said support receiver cutout to present a bearing surface of arcuate cross-sectional configuration to said straight bearing edge for supporting said pendulous member for pendulous movement in a plane perpendicular to the axis of said support means, the mass of said pendulous member being arranged to cause said pendulous member during pendulous movement to seek a vertical orientation in which said straight bearing edge is horizontally disposed and in contact with said support means bearing surface of arcuate cross section along a line perpendicular to said plane of pendulous movement of said pendulous member, said support means being displaceable axially in said housing for displacing said pendulous member between a braked position and a released position in a direction perpendicular to said plane of pendulous movement of said pendulous member;

manually operable means connected with said support means for axially displacing said support means;

bias means urging said support means axially to bring said pendulous member to said braked position and being yieldable for axial displacement of said support means by actuation of said manually operable means to permit movement of said pendulous member to said released position; and brake surface means for restraining said pendulous member against pendulous movement when said pendulous member is in said braked position and permitting pendulous movement of said pendulous member under the influence of gravity when said pendulous member is in said released position.

5. A range determining device as defined in claim 4 further comprising means preventing rotation of said support means relative to said housing.

6. The range finding device as defined in claim 4 further comprising means disposed in said housing limiting pendulous movement of said pendulous member to a predetermined range.

7. A range determining device using the principle of triangulation, comprising:

a housing adapted for orientation about a predetermined axis;

a pendulous member disposed in said housing for pendulous movement under the influence of gravity;

a support receiver arranged in said pendulous member including a cutout having a top straight bearing edge and a spaced pair of straight side edges each perpendicular to said top straight bearing edge;

a support shaft axially extending in said support receiver cutout to present a bearing surface of round cross-sectional configuration to said straight bearing edge for supporting said pendulous member for pendulous movement in a plane perpendicular to the axis of said support shaft, said pair of straight side edges each having a longitudinal dimension greater than the diameter of said bearing surface of round cross-sectional configuration, the mass of said pendulous member being arranged to cause said pendulous member during pendulous movement to seek a vertical orientation in which said straight bearing edge is horizontally disposed and in contact with said support shaft bearing surface along a line perpendicular to said plane of pendulous movement of said pendulous member, said support shaft being displaceable axially in said housing for displacing said pendulous member between a braked position and a released position in a direction perpendicular to said plane of pendulous movement of said pendulous member;

manually operable means connected with said support shaft for axially displacing said support shaft;

bias means urging said support shaft axially to bring said pendulous member to said braked position and being yieldable for axial displacement of said support shaft by actuation of said manually operable means to permit movement of said pendulous member to said released position;

brake surface means for restraining said pendulous member against pendulous movement when said pendulous member is in said braked position and permitting pendulous movement of said pendulous member under the influence of gravity when said pendulous member is in said released position; and means preventing rotation of said support shaft relative to said housing.

8. A range determining device as defined in claim 7 wherein said support receiver cutout is of square configuration with said top straight bearing edge and said pair of straight side edges defining three sides of said square configuration.

9. A range determining device as defined in claim 7 wherein said brake surface means comprises at least one annular surface raised in a direction perpendicular to said plane of pendulous movement of said pendulous member and defining a plane parallel with said plane of pendulous movement of said pendulous member, said raised annular surface being of limited area and substantially coaxial with respect to said support means.

10. The range finding device as defined in claim 7 further comprising means disposed in said housing limiting pendulous movement of said pendulous member to a predetermined range.

* * * * *